US009630104B2

(12) United States Patent
Sherinian

(10) Patent No.: US 9,630,104 B2
(45) Date of Patent: Apr. 25, 2017

(54) SYSTEMS, METHODS, AND APPARATUS FOR TRANSMITTING VIRTUAL WORLD CONTENT FROM A SERVER SYSTEM TO A CLIENT

(76) Inventor: Konrad V. Sherinian, Naperville, IL (US)

( * ) Notice: Subject to any disclaimer, the term of this patent is extended or adjusted under 35 U.S.C. 154(b) by 1544 days.

(21) Appl. No.: 11/875,931

(22) Filed: Oct. 21, 2007

(65) Prior Publication Data

US 2008/0098064 A1   Apr. 24, 2008

Related U.S. Application Data

(60) Provisional application No. 60/862,582, filed on Oct. 23, 2006.

(51) Int. Cl.
| | |
|---|---|
| G06F 15/16 | (2006.01) |
| A63F 13/355 | (2014.01) |
| A63F 13/525 | (2014.01) |
| A63F 13/30 | (2014.01) |
| G06Q 10/10 | (2012.01) |
| G06Q 20/12 | (2012.01) |
| H04L 29/06 | (2006.01) |
| G06Q 20/14 | (2012.01) |
| H04L 29/08 | (2006.01) |

(52) U.S. Cl.
CPC ............ *A63F 13/355* (2014.09); *A63F 13/12* (2013.01); *A63F 13/525* (2014.09); *G06Q 10/10* (2013.01); *G06Q 20/123* (2013.01); *G06Q 20/14* (2013.01); *H04L 67/10* (2013.01); *H04L 67/38* (2013.01); *A63F 2300/538* (2013.01); *A63F 2300/6661* (2013.01)

(58) Field of Classification Search
CPC ......... H04L 67/38; H04L 67/10; G06Q 10/10; G06Q 20/123; G06Q 20/14; A63F 13/12; A63F 13/355; A63F 13/525; A63F 2300/538; A63F 2300/6661
USPC ......................................................... 709/203
See application file for complete search history.

(56) References Cited

U.S. PATENT DOCUMENTS

| | | | | |
|---|---|---|---|---|
| 5,787,333 | A | * | 7/1998 | Rasinski et al. .................. 434/4 |
| 5,878,223 | A | * | 3/1999 | Becker et al. ................ 709/223 |
| 5,894,556 | A | | 4/1999 | Grimm et al. |
| 5,956,039 | A | * | 9/1999 | Woods .............. G06F 17/30902 345/419 |
| 6,106,399 | A | * | 8/2000 | Baker et al. .................... 463/42 |
| 6,128,660 | A | | 10/2000 | Grimm et al. |
| 6,160,551 | A | * | 12/2000 | Naughton et al. ............ 715/769 |
| 6,166,732 | A | * | 12/2000 | Mitchell et al. .............. 715/733 |

(Continued)

OTHER PUBLICATIONS

Resident Evil 4; Oct. 22, 2005; Wikipedia; 7 Pages.*

(Continued)

*Primary Examiner* — Andrew Georgandellis
*Assistant Examiner* — Anthony Fabbri
(74) *Attorney, Agent, or Firm* — Law Offices of Konrad Sherinian

(57) ABSTRACT

Virtual world content is transmitted from at least one server to at least one client computer by defining a camera position on the client computer and projecting a geometrical shape from the camera position in the direction of a viewing vector. This geometrical shape defines a subsection of the virtual world content, which is then transmitted to the particular client, where it is maintained within a content cache.

2 Claims, 9 Drawing Sheets

(56) References Cited

U.S. PATENT DOCUMENTS

| | | | |
|---|---|---|---|
| 6,307,567 B1* | 10/2001 | Cohen-Or | 345/619 |
| 6,315,668 B1* | 11/2001 | Metke et al. | 463/42 |
| 6,345,297 B1 | 2/2002 | Grimm et al. | |
| 6,496,189 B1* | 12/2002 | Yaron et al. | 345/428 |
| 6,509,896 B1* | 1/2003 | Saikawa et al. | 345/419 |
| 6,520,855 B2* | 2/2003 | DeMar et al. | 463/20 |
| 6,640,284 B1* | 10/2003 | Shaw et al. | 711/129 |
| 6,694,482 B1* | 2/2004 | Arellano et al. | 715/251 |
| 6,704,017 B1* | 3/2004 | Yaron et al. | 345/441 |
| 6,758,746 B1* | 7/2004 | Hunter et al. | 463/9 |
| 6,826,311 B2* | 11/2004 | Wilt | 382/281 |
| 6,828,969 B2* | 12/2004 | Kitsutaka | 345/441 |
| 6,860,812 B2* | 3/2005 | Nakazato et al. | 463/30 |
| 6,887,157 B2* | 5/2005 | LeMay et al. | 463/32 |
| 6,887,159 B2 | 5/2005 | Leen et al. | |
| 6,891,546 B1* | 5/2005 | Park et al. | 345/552 |
| 6,899,628 B2 | 5/2005 | Leen et al. | |
| 6,917,899 B2 | 7/2005 | Wilt | |
| 7,010,458 B2 | 3/2006 | Wilt | |
| 7,082,572 B2* | 7/2006 | Pea et al. | 715/720 |
| 7,143,358 B1* | 11/2006 | Yuen | G06F 17/30873 707/E17.111 |
| 2002/0002411 A1* | 1/2002 | Higurashi et al. | 700/91 |
| 2002/0082063 A1* | 6/2002 | Miyaki et al. | 463/1 |
| 2002/0086724 A1* | 7/2002 | Miyaki et al. | 463/9 |
| 2003/0009497 A1* | 1/2003 | Yu | G06Q 10/10 715/256 |
| 2003/0177187 A1* | 9/2003 | Levine et al. | 709/205 |
| 2004/0015608 A1* | 1/2004 | Ellis et al. | 709/246 |
| 2004/0127289 A1 | 7/2004 | Davis et al. | |
| 2004/0128319 A1 | 7/2004 | Davis et al. | |
| 2004/0128624 A1* | 7/2004 | Arellano et al. | 715/530 |
| 2004/0176164 A1* | 9/2004 | Kobayashi | 463/30 |
| 2004/0209684 A1* | 10/2004 | Hisano | 463/32 |
| 2004/0219979 A1* | 11/2004 | Campbell | 463/33 |
| 2004/0267940 A1 | 12/2004 | Dideriksen et al. | |
| 2004/0267952 A1 | 12/2004 | He et al. | |
| 2005/0076057 A1 | 4/2005 | Sharma et al. | |
| 2005/0076214 A1 | 4/2005 | Thomas et al. | |
| 2005/0108414 A1 | 5/2005 | Taylor et al. | |
| 2005/0187015 A1* | 8/2005 | Suzuki et al. | 463/32 |
| 2005/0192097 A1 | 9/2005 | Farnham et al. | |
| 2006/0082573 A1* | 4/2006 | Konno et al. | 345/419 |
| 2007/0198658 A1* | 8/2007 | Aggarwal et al. | 709/219 |
| 2007/0250479 A1* | 10/2007 | Lunt | G06Q 10/10 |
| 2008/0319656 A1* | 12/2008 | Irish | A63F 13/12 701/532 |
| 2009/0089157 A1* | 4/2009 | Narayanan | 705/14 |
| 2010/0093434 A1* | 4/2010 | Rivas | A63F 13/12 463/35 |
| 2013/0061154 A1* | 3/2013 | Bennett | G09B 5/00 715/753 |

OTHER PUBLICATIONS

Unknown Author; Hero Quest Game System manual; 1990; Milton Bradley; Hero Quest board game; pp. 2 and 4.*

Unknown Author; Hero Quest Game System manual; 1990; Milton Bradley; Hero Quest board game; All internal pp. 3-23.*

Stransky, "Review: TibiaME—Cell Phone Multiplayer is Possible," Nov. 22, 2007.

Unknown, "The First M3RPG—Back in 2003", Dec. 25, 2006.

Unknown, "How CipSoft Made Tibia Come Alive," Aug. 4, 2009.

* cited by examiner

SYSTEMS, METHODS, AND APPARATUS FOR TRANSMITTING VIRTUAL WORLD CONTENT FROM A SERVER SYSTEM TO A CLIENT

CROSS REFERENCE TO RELATED APPLICATIONS

The present invention claims priority under 35 U.S.C. §119(e) from U.S. Provisional Patent Application No. 60/862,582, entitled "SYSTEMS, METHODS, AND APPARATUS FOR TRANSMITTING VIRTUAL WORLD CONTENT FROM A SERVER SYSTEM TO A CLIENT," filed on behalf of inventor Konrad V. Sherinian on Oct. 23, 2006.

FIELD OF THE INVENTION

The present invention relates generally to virtual world technology and more particularly to transmitting virtual world content from a server to a client using a data network.

DESCRIPTION OF THE PRIOR ART

A virtual world is a two-dimensional or three-dimensional computer simulated environment that a user interacts with. In a typical virtual world, a computer user operates a computer that simulates an environment similar to the real world. Software operating on the computer, known as the virtual world engine, is responsible for generating sights, sounds, and possibly force feedback based on the user's input. Usually, the user controls an avatar within the virtual world, and the user's input determines the avatar's facing and position within the virtual world. The virtual world engine then draws a scene based on the avatar's position and facing within the virtual world, mimicking what the avatar would see. Sounds are also produced based on the user's position and facing in such a manner as to simulate what the user's avatar would actually hear. In addition, some virtual engines produce force feedback to the user's input device based on the user's actions and the terrain the user's avatar is traversing, with the objective being to simulate what the user's avatar would be feeling.

A virtual world requires, at a minimum, a computer system running the virtual world engine software, and content stored on the computer system that describes the characteristics of the virtual world. Both networked and stand alone virtual worlds have been produced. One popular type of networked virtual world is known as a Massively Multiplayer Online Role Playing Game (MMORPG). MMORPGs allow hundreds or even thousands of users to simultaneously explore the same virtual world via avatars, which changes over time in response to actions taken by different users.

The size and complexity of virtual worlds has increased considerably over time. In the early 1990s, two dimensional graphics and simplistic sounds were adequate. However, circa 2005, virtual worlds often feature intricate three dimensional graphics and sophisticated sound effects. Some virtual worlds incorporate separate textures and models dependent on the user's desired revolution. Many virtual worlds incorporate 5.1 or even 7.1 surround sound. Some virtual worlds require hundreds of gigabytes (GB) to store all of the content associated with the world, and the storage requirements of virtual worlds is growing continuously.

Usually, the content comprising a virtual world is distributed to a client computer via a tangible medium, such as one or more Compact Discs (CDs) or Digital Video/Versatile Discs (DVDs). Another way that content is distributed is through a single network transfer through file-transfer protocol (FTP) or hypertext transfer protocol (HTTP) byte serving. However, networked virtual worlds, and MMORPGs in particular, frequently need to update their virtual world content. Usually these updates fall into one of two categories.

The first category of updates involves a change within the virtual world that users of the virtual world must be made aware of. For instance, users within an MMORPG can take and move objects from one spot to another. Other viewers then will see the object in its new location. Generally, updates of this type are distributed through the virtual world engine itself.

The second category of updates involves the addition of a new area within the virtual world. For instance, many MMORPGs distribute updates to maintain their users interest. Presently, updates like this are distributed in the manner of the original content; i.e.; on CD, downloaded, etc.

Virtual world content includes model data, structure data, object data, landscape data, textures, internal maps, external maps, audio data, object data, avatar data, actor data, and artificial intelligence data. All of these types of content are well defined in the prior art. Virtual world content is now frequently distributed in compressed form, which allows for incremental updates to be downloaded instead of distributed by disk.

One good example of prior art technology is streaming world map systems. These systems stream two-dimensional images of terrain and buildings from a server system to a client system. In addition, they may stream model data and other information. However, these systems do not predict what content a particular user requires. Rather, these systems use a camera position transmitted by the client to determine what content the user should be able to see at any particular moment, and transmit that content. These systems then use level of detail technology well known in the prior art to draw better views of the virtual world incorporating content as it arrives.

However, present methods of distributing virtual world content rely on large amounts of storage on a user's computer. These methods work well for modern desktop and notebook computers, which often feature hard drives capable of storing hundreds of gigabytes of data. However, the growth in the size of virtual world content is outstripping the growth in hard disk size. Further, many users now carry small handheld devices, which have sufficient computing power and multimedia capabilities to provide an enjoyable virtual world experience. However, these devices have little storage, and therefore, cannot take part in networked virtual worlds in general, and MMORPGs in particular using present virtual world technology.

OBJECTS OF THE INVENTION

Accordingly, it is an object of this invention to transmit virtual world content as needed to different clients without requiring the client to store large amounts of content.

A second object of this invention is to create a virtual world system where a large virtual world can be streamed to clients possessing small amounts of storage, such as cellular phones or portable gaming systems.

A third object of this invention is to timely transmit content to client computer systems so that the virtual world is presented seamlessly on the client computer systems.

SUMMARY OF THE INVENTION

The present invention achieves its objects through by predicting virtual world content required by a virtual world user. In one embodiment of the disclosed invention, information is transmitted from a client to a server, and based on that information, the server predicts what virtual world content is required by the client. The server then transmits the predicted virtual world content to the client. In a further refinement of this embodiment, the transmitted information comprises behavior information associated with an avatar associated with the client. In yet a further refinement of this embodiment, the user of the computer system would have a particular subscription level. Content associated with the user's subscription level would automatically be transmitted to the client. However, if the user approached content not associated with the user's subscription level, the user would be queried to authorize payment for a subscription level which permitted access to the additional content.

In another embodiment of the disclosed invention, virtual world content is transmitted from a server to a client based on a position defined on the client and transmitted to the server. A geometrical shape is projected from the position, and virtual world content within the geometrical shape is transmitted to the client.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

This application discloses systems, apparatus, and methods for predictively transferring content from a server system to a client computer where it is maintained in a content cache. Generally, the client computer's content cache can be implemented using techniques well known in the art along with the improvements disclosed herein. In one embodiment of the disclosed invention, the client computer's content cache is implemented using a least recently used (LRU) scheme, as modified herein. The disclosed prediction methods rely on the past and present behavior of an avatar associated with the client computer to determine what content the client computer is most likely to require next.

Figure 1:
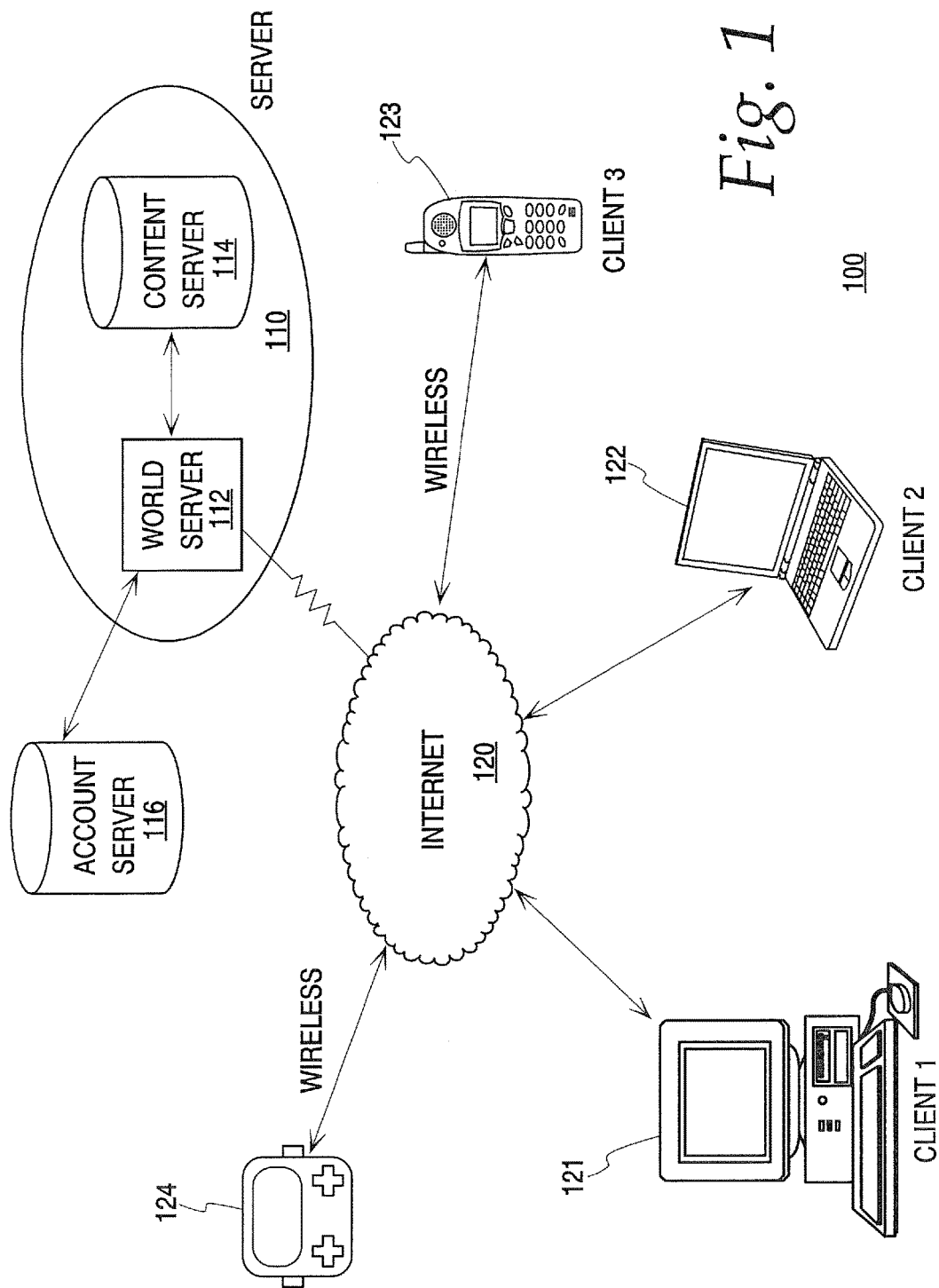
FIG. 1 is a block diagram of a system for streaming virtual world content to a plurality of clients.

Referring to the Figures, and in particular to FIG. 1, a virtual world content streaming system 100 is shown. A server system 110 comprises a world server 112, a content server 114, and an account server 116. The account server 116 maintains a list of all persons who have an account with the particular server system 110. In addition, the account server 116 tracks which users are presently using (i.e.; "logged on") the system, and billing or subscription information related to each user, as well as any information required to reconstruct the user's particular representation of the virtual world. Such information could comprise an inventory of items possessed by the user's avatar, a list of "real" (i.e.; houses, shops, etc.) property or vehicles owned by the user's avatar, which areas the user has explored, the avatar's position and facing within the virtual world when last "saved," etc. These functions of the account server 116 are well known in the art. In addition, the account server 116 can maintain a list of content a particular user is authorized to enter. For instance, in a MMORPG, a user may be authorized to enter into the "starting area" (usually a large city) and all outdoor areas, but not to enter into any structures outside of the starting area unless the user pays a higher subscription fee, or pays an additional fee for all or part of the extra content.

The content server 114 maintains a database of all content within the particular virtual world implemented by the virtual world streaming system 100 using techniques well known in the art.

The world server 112 maintains an individualized world representation for each active user. Utilizing a content requirement prediction technique, the world server 112 generates content requests for the content server 114 from which it receives content, and then forwards the content onto the appropriate client. FIG. 1 depicts four clients connected to the server system 110. However, real world applications of the disclosed invention would likely, but not necessarily, support hundreds, thousands, or even tens of thousands of simultaneous clients.

The world server 112 is connected to a network 120, such as the Internet, via a communication link. Desktop computer client 121 and notebook computer client 122 are connected to the network 120 through a wired connection, while cellular telephone client 123 and mobile gaming device client 124 are connected to the network 120 via wireless links.

Note that while FIG. 1 depicts one possible implementation of a virtual world content streaming system utilizing the disclosed invention, many other systems could utilize the disclosed invention. For instance, the server 110 could be implemented in a single computer (instead of three as drawn), or even within a single program, or alternatively, the world server 112 could be implemented as a group of servers, each maintaining a particular area of the virtual world.

Figure 2:
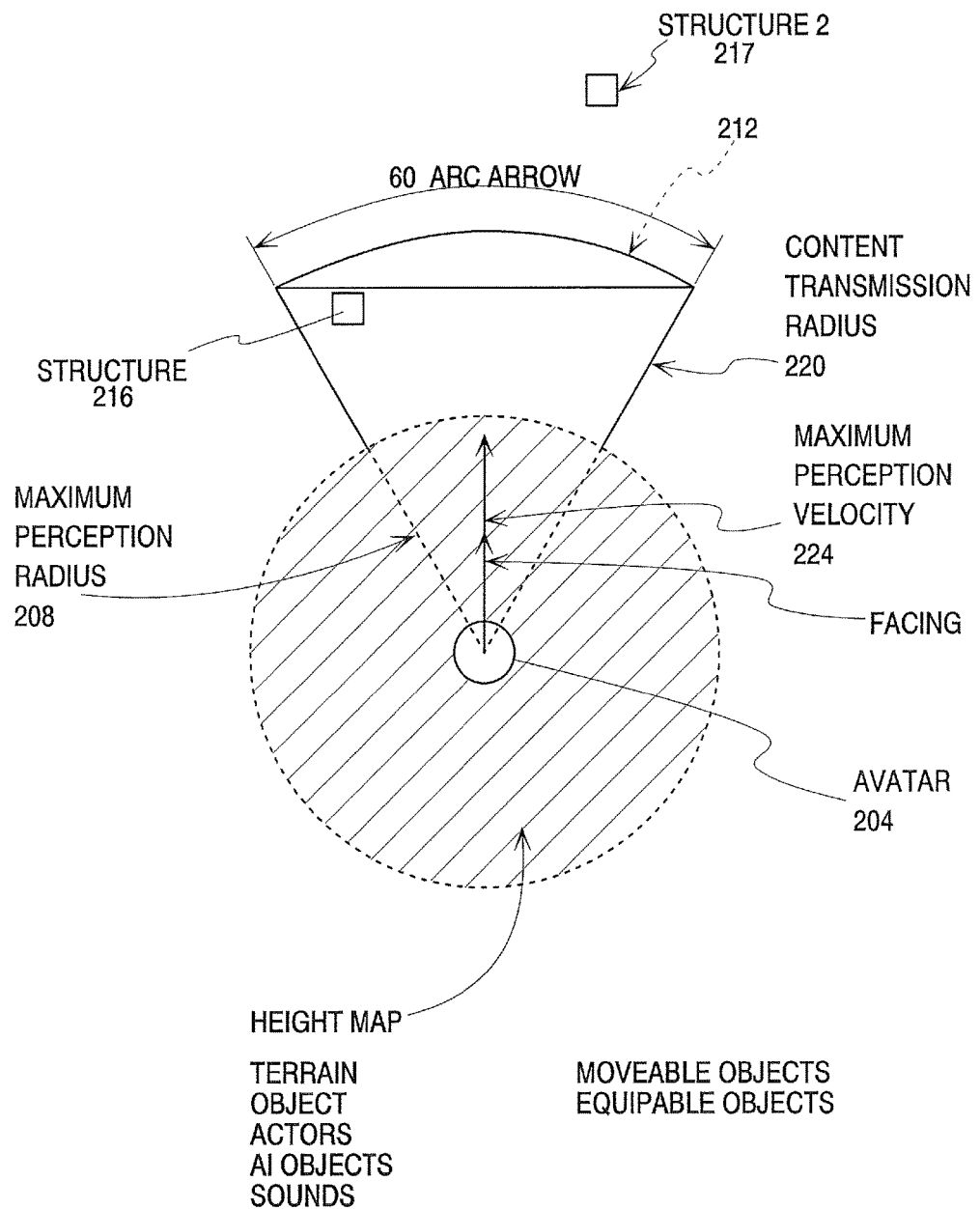
FIG. 2 is a visual view of an embodiment of the disclosed content transmission algorithm.

FIG. 2 visually depicts one possible algorithm using the principles of the disclosed invention to predictively transmit content from a server system 110 to at least one client 121-124. This algorithm is referred to later in the application as the "Location-Velocity Content Transfer," or LVCT for short. A simple virtual world map 200 is shown with an avatar 204 located at the center. Using virtual sight, hearing, and possibly other senses (via force feedback for instance), the avatar has a maximum perception radius 208. In addition, a geometrical shape 212, such as a two or three dimensional arced surface or a frustrum, is projected from the avatar in the direction that the avatar is looking. All virtual world content unknown to the avatar's 204 client 121-124 which is within either the avatar's maximum perception radius 208 or the boundaries of the geometrical shape 212 are transmitted to the avatar's 204 client 121-124. Some possible examples of transmitted content are height maps, terrain, objects, moveable objects, equippable objects, actor definitions, artificial intelligence objects, and sounds. As drawn, structure 216 is within the boundaries of geometrical shape 212. In one embodiment of this invention, all information regarding structure 216 is queued for transmission to the client 121-124 as soon as the structure 216 comes within the boundaries of the geometrical shape 212. However, given that structures can comprise enormous amounts of content, transmitting all content associated with the structure at once could overload the content cache maintained on the client 121-124 depending on the type of client (i.e.; desktop computer vs. cellular phone). A more refined method for selectively transmitting structure content is detailed later in this application.

A further refinement of the algorithm detailed in FIG. 2 involves the use of the avatar's 204 confirmed heading. Using this algorithm, all content within the avatar's maximum perception radius 208 would be transmitted to the client. In addition, a further distance, perhaps out to 1.1 times the maximum perception radius 208 would also be queued for transmission to the client. However, until the client moved in a particular direction for a predetermined time period, such as 2 seconds, further content (i.e.; out to two times the avatar's 204 maximum perception distance 208) would not be streamed. Yet another refinement of the algorithm depicted in FIG. 2 would be to use the avatar's 204 velocity vector 224 to determine how far to extend the content transmission radius 220 beyond the avatar's maximum perception radius 208, with the content transmission radius being directly proportional to the magnitude of the velocity vector.

Figure 2A:
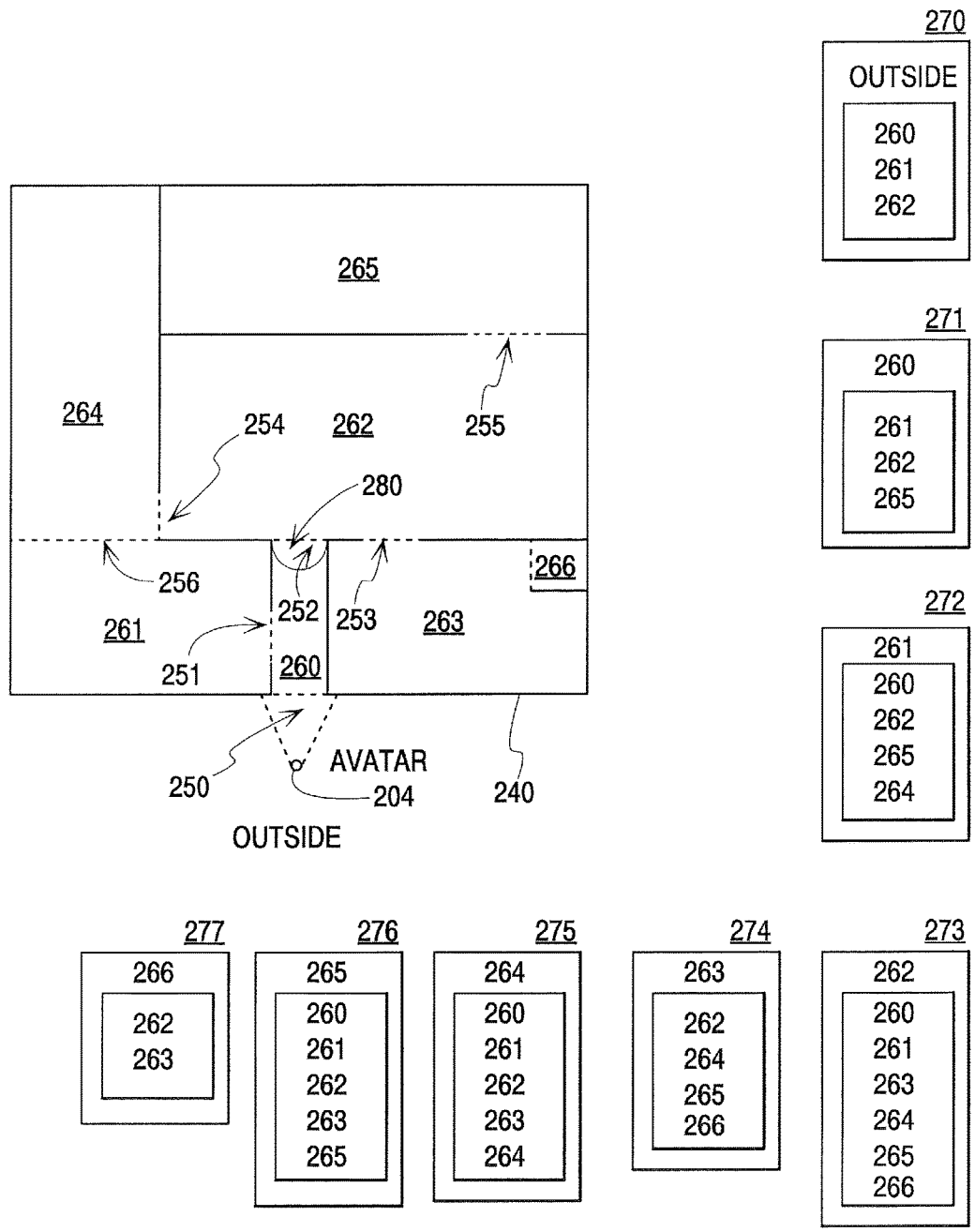
FIG. 2A is a visual view of an embodiment of the disclosed content transmission algorithm applied to structures as opposed to general content types.

Instead of transmitting all content associated with a structure, a more refined algorithm could be used instead. One example of such an algorithm is illustrated in FIG. 2A. As illustrated, FIG. 2A utilizes a portal structure to progressively transmit visual content. However, the principles of this invention can easily be extended to non-visual content (i.e.; sounds, object definitions, etc.) as well as to other spatial data structures, such as bounding volume hierarchies, binary space partitioning (BSP) trees, or octrees.

In FIG. 2A, the avatar 204 stands outside a structure 240. Depending on where the avatar is disposed, and the avatar's facing, from outside the structure 240, the avatar can see through portal 250 to area 260, through portal 251 to area 261, and through portal 252 to area 262. This is shown in content list 270, which indicates that areas 260-262 should be transmitted to the avatar when the avatar is positioned outside the structure 240. If the avatar should move into area 260, then the avatar will be able to see through portal 251 into area 261, through portal 252 to area 262, and through portal 255 to area 265. Accordingly, content list 271 is associated with area 260. Content lists 272-277 show which areas are potentially visible to the avatar for other areas within the structure 240. Using this information, which can be predetermined using simple raycasting algorithms well known to those skilled in the art, the world server 112 can selectively transmit only the content required by a particular client 121-124. However, for the goal of seamless presentation of the virtual world on the client computer system to be met, the content associated with a particular area must be transmitted to the client computer system before the avatar actually breaches a portal leading into a particular area. This can be accomplished by defining a portal transmission radius 280 centered at the center of the portal and transmitting the content associated with the area whenever the avatar breaches that area.

A further refinement of the algorithm depicted in FIG. 2A involves the use of the avatar's velocity vector to determine where the avatar appears headed, and to transmit content appropriately. Therefore, if based on the avatar's velocity vector and facing, the server system predicts that the avatar will breach a particular portal's portal transmission radius 280 within a predetermined period of time, such as two seconds, the server system can queue the content list associated with the area in question for transmission. This allows the server to less frequently update a particular client computer system with content.

Figure 3A:
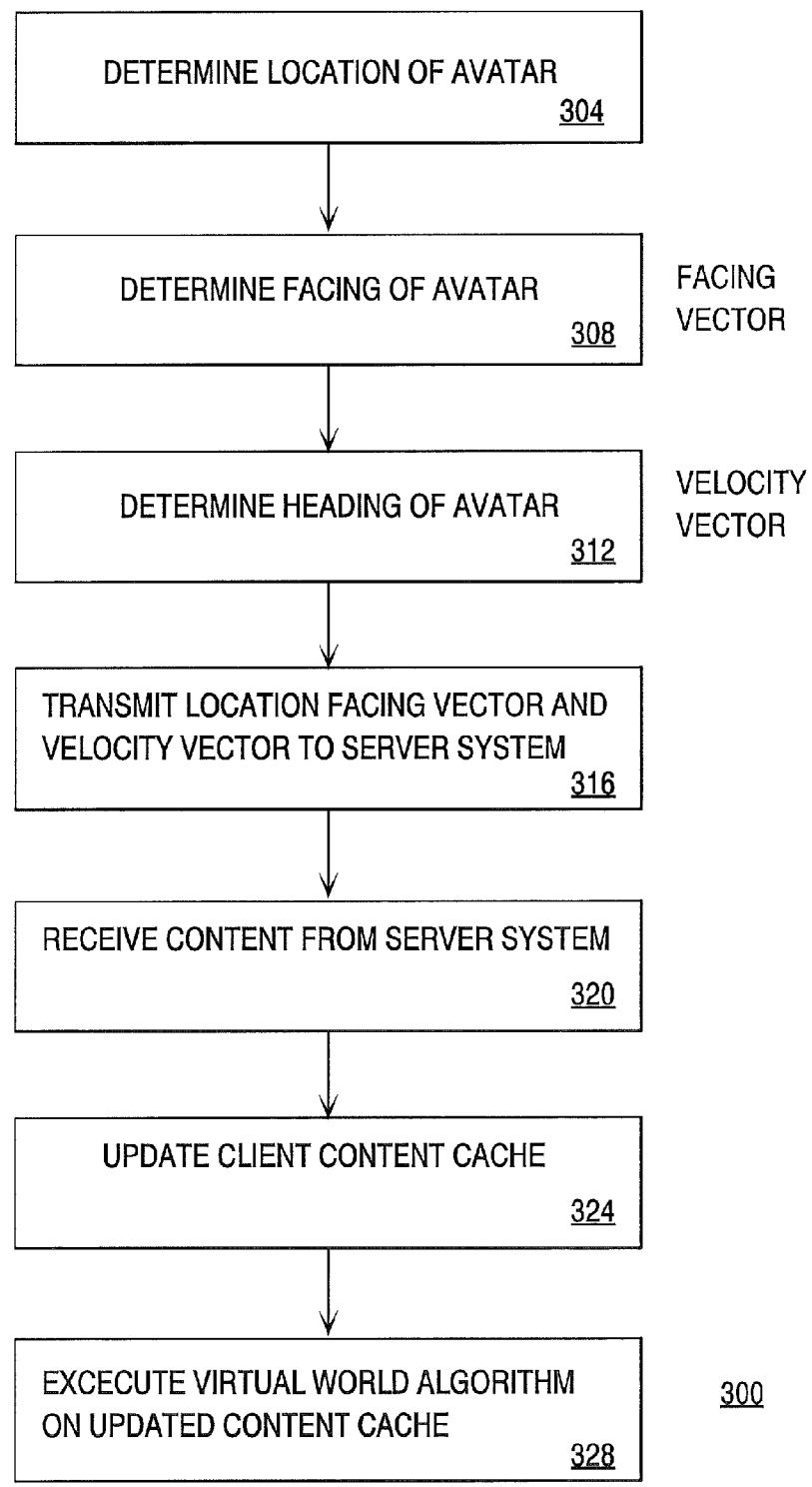
FIG. 3A is a flowchart illustrating one possible set of steps executed on a client to implement the algorithm shown in FIG. 2.

FIG. 3A is a flowchart showing one possible set of steps executed on a client computer implementing the disclosed invention. In step 304 the client computer notes the position of the avatar. Next, in step 308, the avatar's facing is determined. In step 312, the avatar's heading, which could be different from the avatar's facing (i.e.; the avatar is looking in a different direction that it is moving), and correspondingly the avatar's velocity vector is determined. In step 316, the client transmits the information required by the server, such as the avatar's position, facing vector, and velocity vector. The server system will then execute steps, such as those illustrated in FIG. 3B, to retrieve the correct content and transmit it to the client. In step 320, the client receives the content from the server, and in step 324, the client updates its content cache. Finally, in step 328, the client utilizes the new content as required within its virtual world engine to render a scene.

Figure 3B:
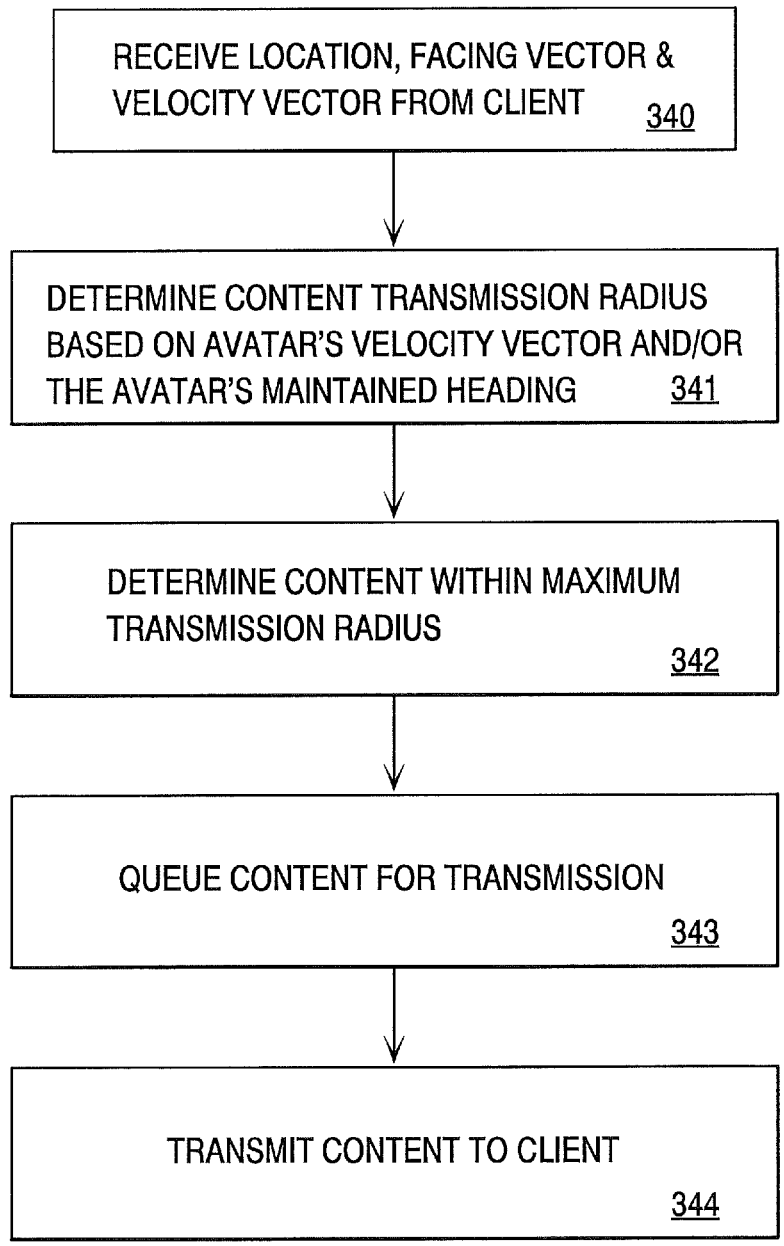
FIG. 3B is a flowchart illustrating one possible set of steps executed on a server to implement the algorithm shown in FIG. 2.

FIG. 3B is a flowchart showing one possible set of steps executed on a server system implementing the disclosed invention. In step 340, the server system receives a particular avatar's location, facing vector, and/or velocity vector from a particular client. Optionally, in step 341, the server determines the appropriate content transmission radius for the particular avatar based on the avatar's velocity vector and/or the time the avatar has maintained a particular heading. In step 342, the server system determines the content within the particular avatar's maximum transmission radius. The server then queues that content in step 343 and transmits it to the particular client in step 344.

Figure 3C:
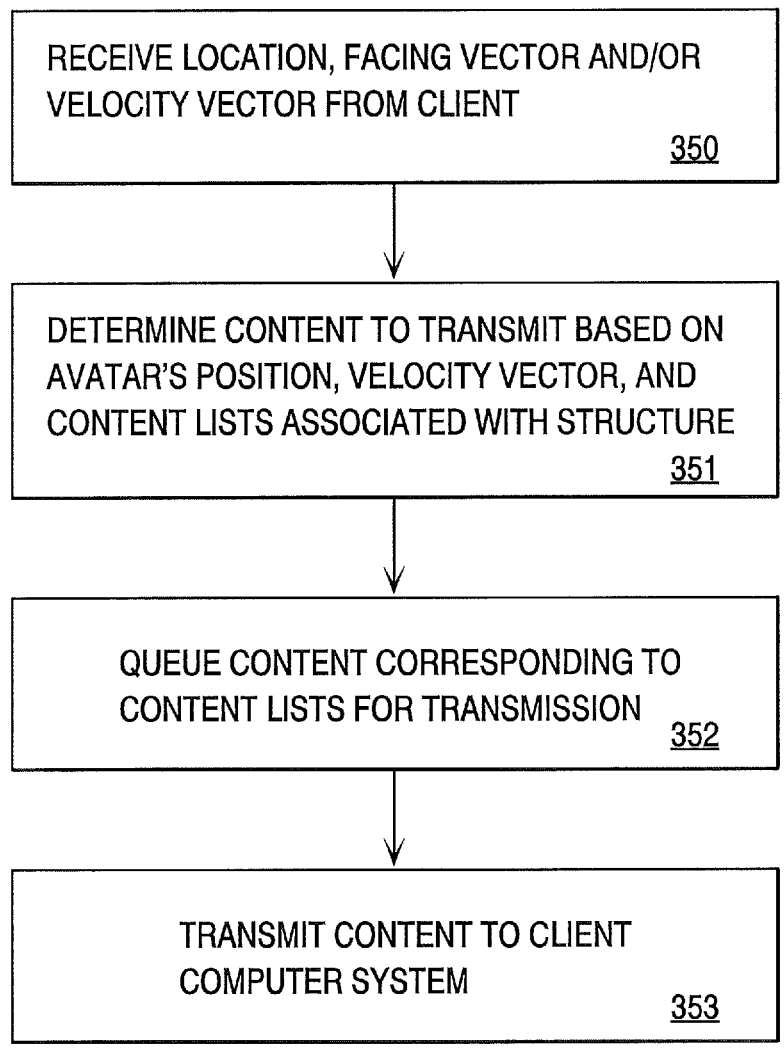
FIG. 3C is a flowchart illustrating one possible set of steps executed on a server to implement the algorithm shown in FIG. 2A.

The algorithm executed by the client computer implement the structure based selective content transmission algorithm illustrated in FIG. 2A is identical to the algorithm disclosed in FIG. 3A. However, the server system algorithm will differ somewhat for structures as opposed to the general server system algorithm disclosed in FIG. 3B. FIG. 3C illustrates a server system algorithm tailored to structural content. In step 350, the server system receives a particular avatar's location, facing vector, and/or the avatar's velocity vector from a client computer system. In step 351, the server system generates content requests for the content server based on the avatar's position and optionally the avatar's velocity vector, as well as the content lists associated with the particular area the avatar presently occupies or appears headed towards as discussed earlier. In step 352, the server system queues content corresponding to the requests generated in step 351, and transmits that content to the appropriate client computer system in step 353.

It should be noted that the steps shown in FIG. 3A and FIG. 3B are only one possible embodiment of the disclosed invention, and, in particular, the shown steps may be executed on either the client or server as required by the particular implementation.

Figure 4:
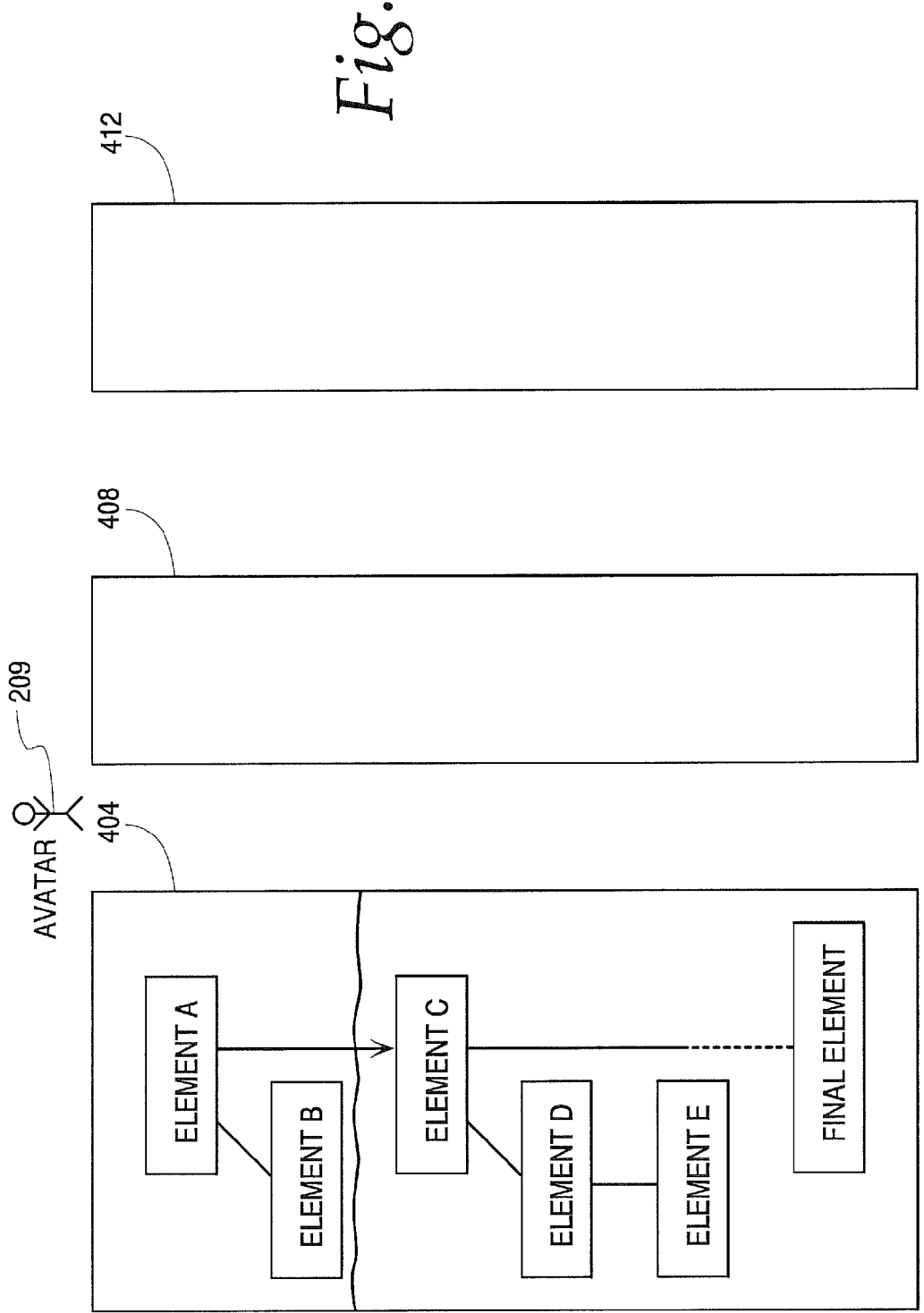
FIG. 4 is a visual view of an alternate embodiment of the disclosed content transmission algorithm.

FIG. 4 visually depicts a second algorithm using the principles of the disclosed invention to predictively transmit content from a server system 110 to at least one client 121-124. This algorithm requires at least one structured story line be integrated within the virtual world, and is henceforth referred to as "Storyline Content Transfer" or SCT. Each structured story line can be comprised of multiple story elements. For the purposes of this application, a story element comprises a story event, such as finding an object or solving a puzzle, associated with a particular location. Similar structures are also envisioned as falling within the definition of story element.

As depicted, avatar 204 is involved in multiple story lines, 404, 408, and 412. While only three story lines are shown, the avatar 204 may be involved in any number of story lines. Story line 404 comprises multiple sequential story elements. As shown there is a central story line, comprised of element A, element C, final element, and other elements not shown. In addition, there are other "sub-plots," which branch off of the main story line. Element B comprises one such sub-plot, and elements D and E comprise another. As depicted, avatar 204 has completed all story line requirements of element A and element B of story line 204. As these elements have already been completed, it is less likely that avatar 204 will revisit any areas associated with the completed story elements, or require content associated with the completed story elements. On the contrary, as avatar 204 has not completed the story line requirements of element C, element D, element E, and other elements including the final element, it is more likely that avatar 204 will visit areas associated with those elements and therefore require the corresponding content. As avatar 204 is not likely to visit locations associated with elements A and B, content associated with elements A and B is less likely to be required by the client computer 121-124 hosting avatar 204. When purging content from the client computer 121-124 content cache, the system can account for this, and correspondingly eliminate content associated with elements A and B earlier than would otherwise occur.

While SCT can be used alone, SCT is especially useful when used to enhance LVCT or another primary content transfer prediction algorithm. When used in this way, SCT effectively becomes a secondary decision making factor, which can be used to increase the likelihood that certain content, such as the next element in a particular storyline; i.e.; element C of story line 404; will be transferred to the client or maintained in the client cache. For instance, referring to FIG. 2, structure A 217 is shown as outside of the content transmission radius 220 as established by the LVCT algorithm. However, if structure A 217 is associated with story line element C of FIG. 4, SCT will examine the avatar's heading/velocity vector 224 and as avatar 204 appears headed towards structure A 217, will give content associated with structure A 217 a higher weight than that associated with structure 216.

Figure 5A:
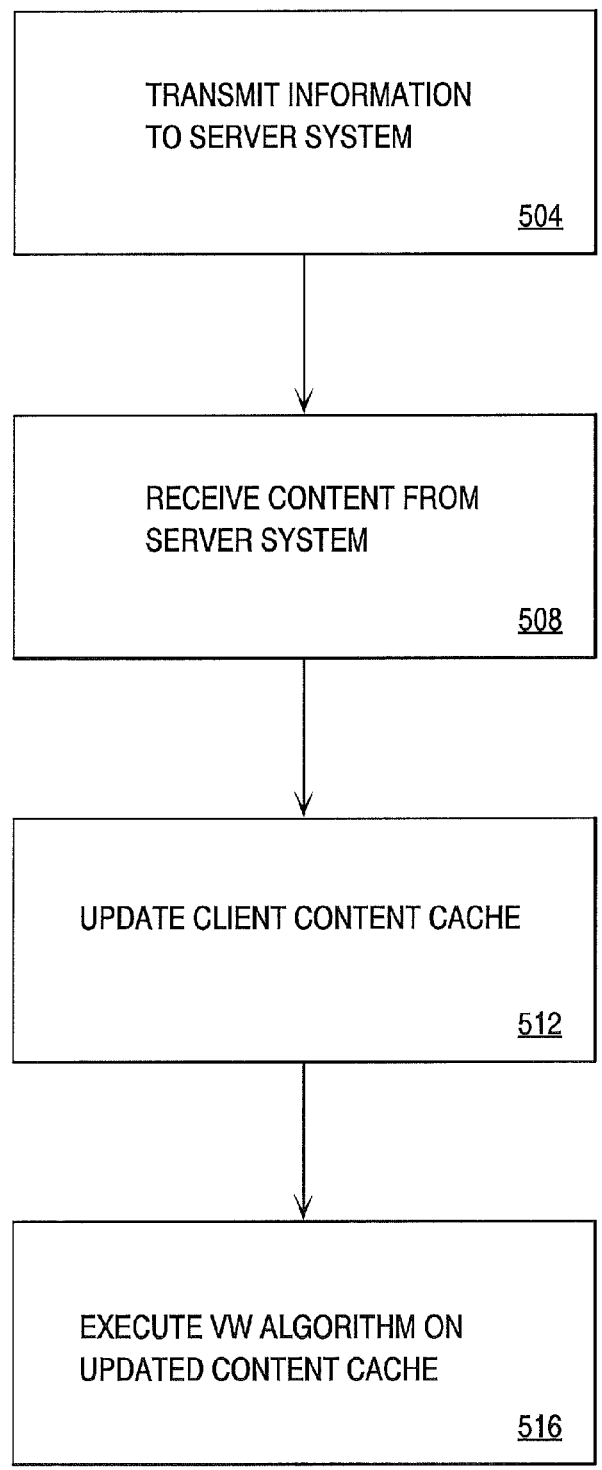
FIG. 5A is a flowchart detailing one possible set of steps executed on a client to implement the algorithm shown in FIG. 4.

FIG. 5A illustrates one possible set of steps that can be executed by a client computer implementing the disclosed invention. In step 504, the client computer 121-124 transmits certain information associated with an avatar 204 to the server system 110. The transmitted information could be LVCT information, information associated with some other predictive content transfer scheme, or information stored on the client computer 121-124 indicating story line elements completed by the avatar. Note that story line element information may also be stored on the server system 110. In step 508, the client computer 121-124 receives content from the server system 110. The client computer updates its content cache in 512, and executes its virtual world algorithm on the updated content cache in step 516. Note that the content cache can be the same as the virtual world database.

Figure 5B:
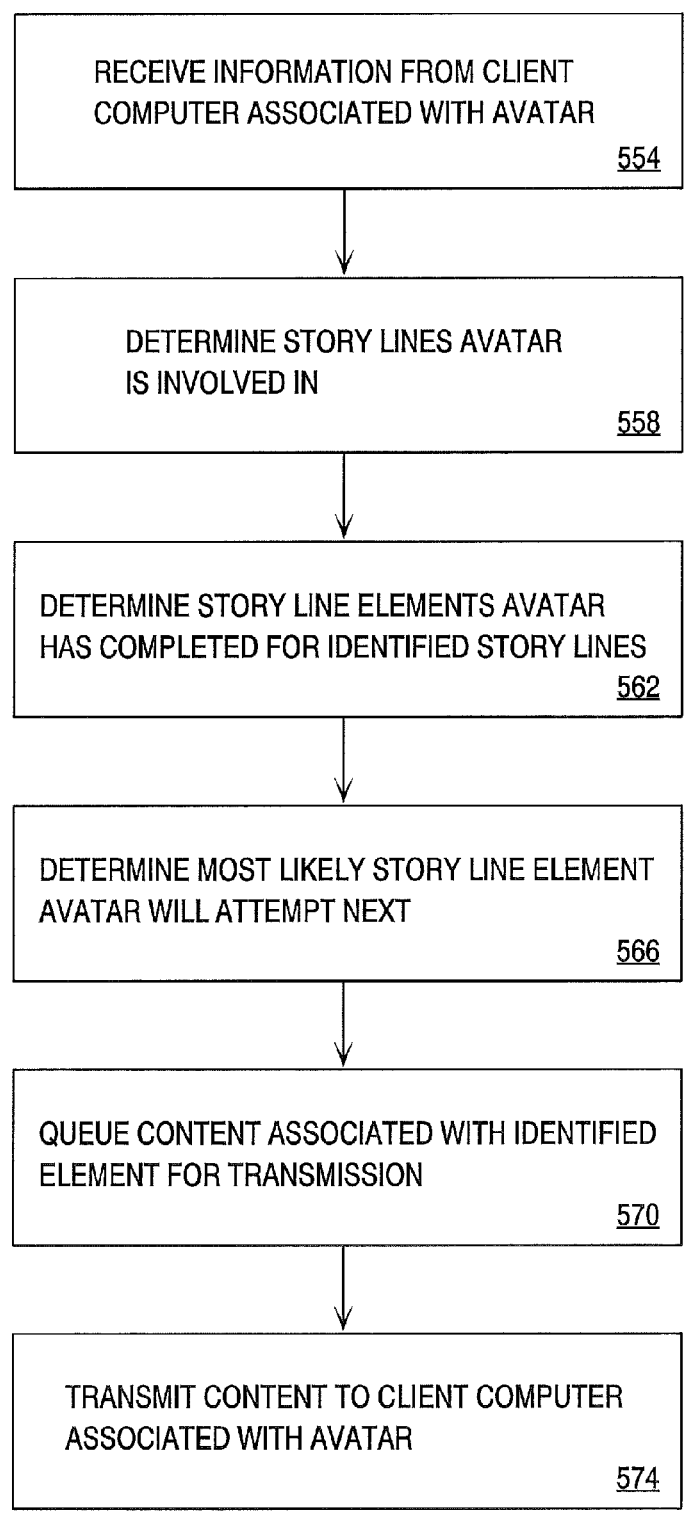
FIG. 5B is a flowchart detailing one possible set of steps executed on a server to implement the algorithm shown in FIG. 4.

FIG. 5B illustrates one possible set of steps that can be executed by a server system implementing the disclosed invention. In step 554, the server system 110 receives information associated with an avatar 204 from the client computer 121-124. In step 558, the server system 110 determines what story lines the avatar 204 is involved in. The server system 110 determines which story line elements the avatar 204 has completed within the identified story lines in step 562. In step 566, the server system examines all story line elements in all story lines and determines the story line element the avatar will most likely attempt next. In step 570 the content associated with the identified story line element is queued for transmission, and that content is transmitted to the client computer 121-124 in step 574.

In a further refinement of the disclosed algorithms, the server could contain a representation of content within the client's content cache. The server could then transmit only that content not already present within the client's content cache. In addition, the server could directly control the client's content cache.

It should be noted that the steps shown in FIG. 5A and FIG. 5B are only one possible embodiment of the disclosed invention, and, in particular, the shown steps may be executed on either the client or server as required by the particular implementation.

As discussed earlier in association with the account server 116, the principles of this invention may also be used to distribute virtual content for a fee. For instance, in many MMORPGs, avatars increase in power as they explore more areas of the virtual world. Content areas may be segregated by the avatar power, so that the most powerful adversaries, treasure, etc. can be concentrated within one content area, and correspondingly less powerful adversaries, treasures, etc. can be concentrated in other content areas. One way that content may be distributed for a fee would be to charge different subscription levels, wherein an introductory subscription could include content associated with a "starting area" as well as content areas associated with the least powerful adversaries, treasures, etc. The first subscription level could be free or a fee could be charged. When the user first created an account with the server system 110, billing information, such as a credit card, would be collected. If the initial subscription was free, the credit card would not be charged.

Additional subscription levels, at correspondingly higher fees, could include more power adversaries, treasures, etc. As a user's avatar approached a content area not covered by the avatar's subscription level, the server system 110 could cause the user's client computer 121-124 to prompt the user to authorize the higher subscription fee. The server system 110 could then use billing information gathered from the user when the user first created an account and validate that the additional fee would be acceptable with a creditor associated with the billing information provided by the user. After validating the user's billing information for the additional fee, the user's avatar would be allowed to proceed into the content areas associated with the user's new subscription level.

An additional embodiment of the disclosed invention may allow access to specific content areas for a fee. Using this embodiment, the user could pay a subscription fee for "basic" access to the virtual world, or basic access could be free. Premium content areas, which could be associated with more powerful adversaries, could only be accessed if the user's account indicated that the user had paid for them. As a user's avatar approached a content area that the user had not yet paid for, the server system 110 could cause the user's client computer 121-124 to prompt the user to authorize the payment for the premium content area. The server system 110 could then use the billing information provided by the user when the user first created an account as explained earlier.

Note that this application uses the terms client and server. Within this application, the term client means a consumer of content, and the term server means a provider of content. Using the definitions within this application, web browsers, among other client programs, would fall within the definition of client, and web servers, among other server programs, would fall within the definition of server.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. A method for transmitting virtual world content to at least one client computer from one or more servers maintaining a virtual world, the at least one client computer maintaining a cache of virtual world content, the method comprising the steps of:
   defining a position and direction of an avatar associated with a particular client computer within said virtual world at a particular time, said avatar having one or more virtual senses including virtual sight;
   defining a content transmission radius about said position encompassing a first set of virtual world content, said content transmission radius being greater than a maximum visual perception radius of said avatar;
   projecting from said position and in said direction that said avatar is facing, a three-dimensional geometrical shape extending a distance equal to said content transmission radius,
   determining that a first content is inside the geometrical shape but outside of the maximum visual perception radius, and a second content is both outside of the geometrical shape and outside of the maximum visual perception radius;
   determining whether the first and second contents are associated with a next most likely element of a story line of the virtual world;
   queuing the second content before the first content if the second content is determined to be associated with the next most likely element of the story line but the first content is not; otherwise, queuing the first content before the second content.

2. A system for transmitting virtual world content comprising:
   at least one server coupled to a data network, the at least one server adapted to maintain a virtual world comprising a collection of virtual world content;
   at least one client computer coupled to said network;
   a first software component executing on a particular one of said at least one client computer and adapted to respond to input from a user of said particular client computer, said first software component configured to define a position and direction of an avatar associated with said particular client computer within said virtual world at a particular time, said avatar having one or more virtual senses including virtual sight, said first software component also adapted to maintain a cache of virtual world content;
   said first software component further configured to define a content transmission radius about said position, said content transmission radius being greater than a maximum visual perception radius of said avatar;
   a second software component executing on said at least one server and adapted to receive said position defined by said first software component and further adapted to project from said position and in said direction that said avatar is facing, a three-dimensional geometrical shape extending a distance equal to said content transmission radius from said position;
   the second software component being adapted to determine that a first content is inside the geometrical shape but outside of the maximum visual perception radius, and a second content is both outside of the geometrical shape and outside of the maximum visual perception radius;
   the second software component being adapted to determine whether the first and second contents are associated with a next most likely element of a story line of the virtual world;
   the second software component being adapted to queue the second content before the first content if the second content is determined to be associated with the next most likely element of the story line but the first content is not; otherwise, queuing the first content before the second content;
   the second software component being adapted to transmit the queued content from the at least one server to the particular client computer.

* * * * *